W. H. RIPPIN.
DOUGH MOLDING MACHINERY.
APPLICATION FILED NOV. 23, 1912.

1,125,399.

Patented Jan. 19, 1915.

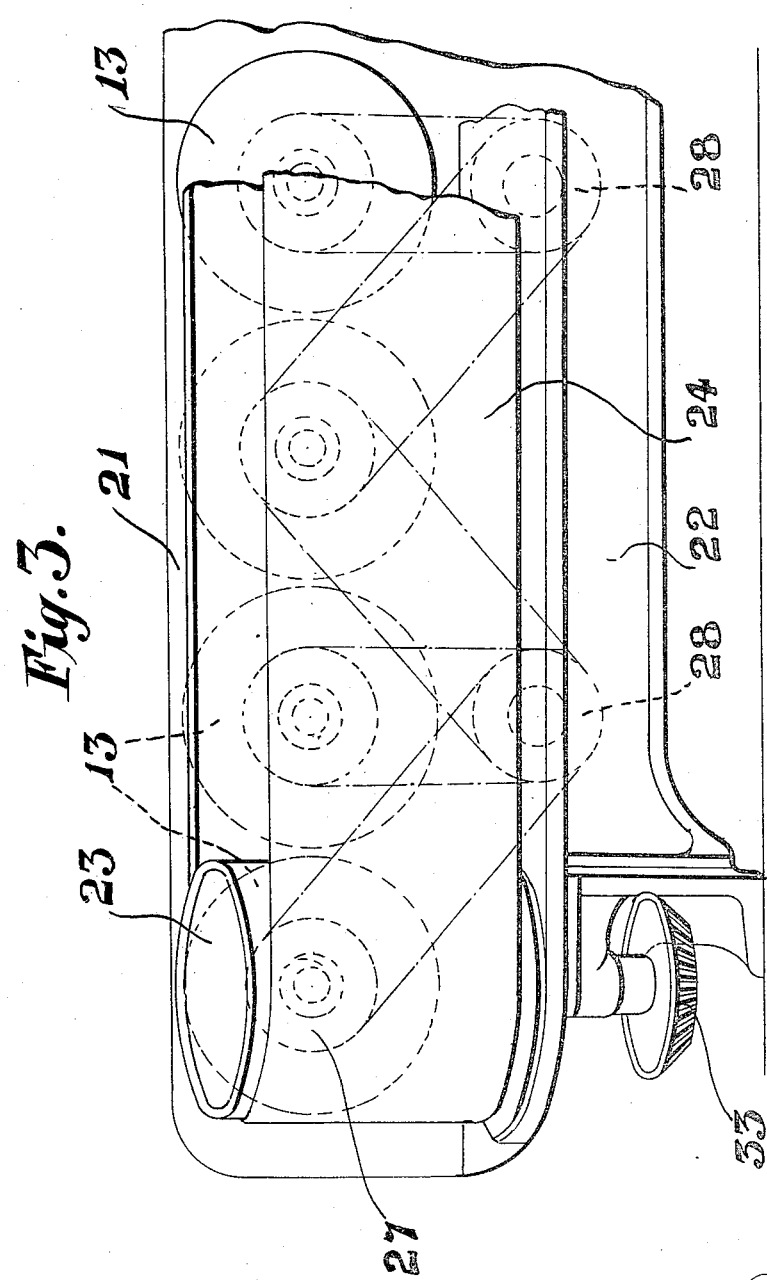

UNITED STATES PATENT OFFICE.

WILLIAM HEYCOCK RIPPIN, OF LEICESTER, ENGLAND.

DOUGH-MOLDING MACHINERY.

1,125,399. Specification of Letters Patent. Patented Jan. 19, 1915.

Application filed November 23, 1912. Serial No. 733,061.

*To all whom it may concern:*

Be it known that I, WILLIAM HEYCOCK RIPPIN, a subject of the Kingdom of Great Britain, residing at Central avenue, Leicester, in the county of Leicester, England, manufacturer, have invented certain new and useful Improvements in Dough-Molding Machinery, of which the following is a specification.

This invention relates to dough molding machinery in which pieces of dough are progressively rolled or squeezed in a trough, the present improvements having for their object further mechanical means whereby the pieces of dough are progressively stretched, drawn down and tightened to the closing and partly turned around in a manner substantially resembling that of the hand.

According to the present invention a series of revoluble disks, cones or equivalent members are incorporated in the trough and these disks revolve during the passage of the dough around or along the trough and tuck or press down the said dough toward the closing and give a part turn, while at the same time tightening the dough so that it will stand up well for proof and not run out and make a squat loaf when baked.

According to one convenient form of the present invention a rotor and stator are employed to form an annular channel and the disks may be mounted upon the face of either the rotor or stator or according to another convenient arrangement the channel may be of a straight or arc shaped or other configuration.

In order that this invention may be clearly understood and readily carried into practice, reference may be had to the appended explanatory sheet of drawings, upon which:—

Figure 1:
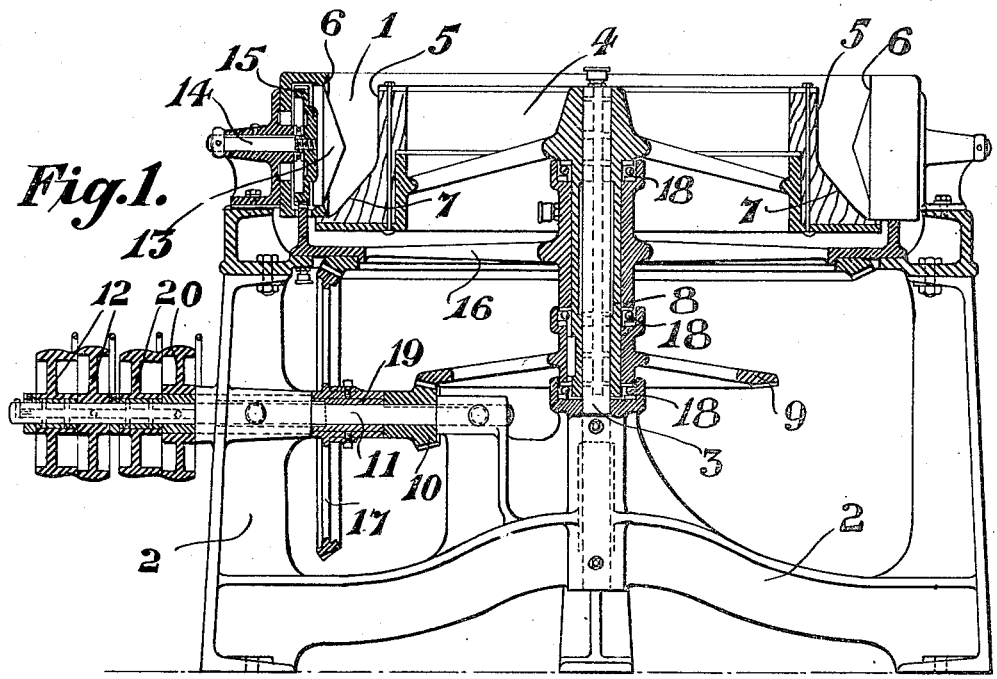
Figure 2:
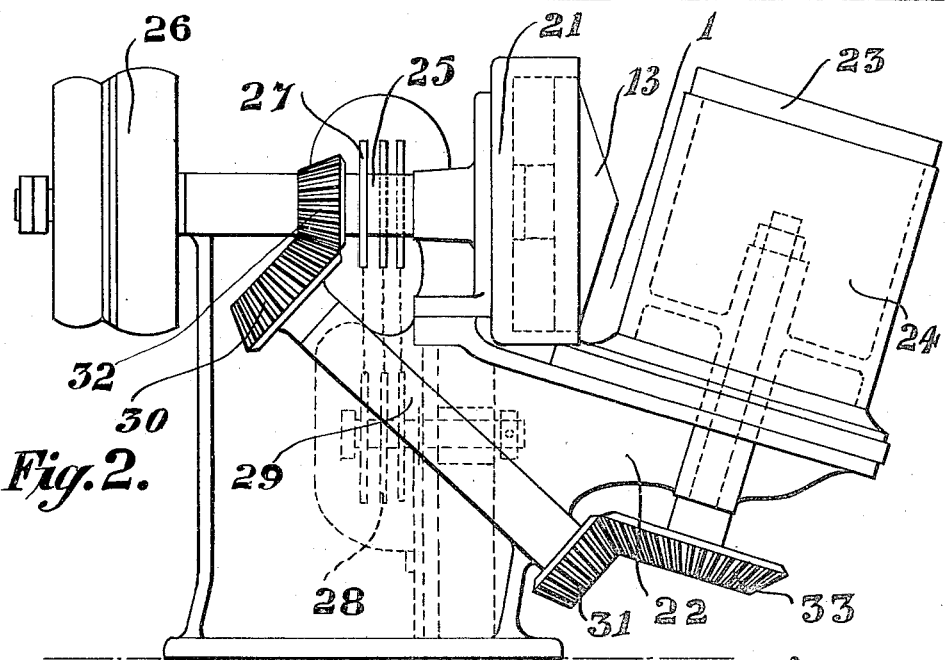

Figure 1 is a sectional elevation of a dough molding machine constructed in accordance with one form of the present invention. Fig. 2 is an end view of another form of dough molding machine, and Fig. 3 is a side elevation thereof.

In one embodiment of this invention the stator 1 consists of an external ring fixed in a horizontal plane and said ring is bolted, clamped, or otherwise secured to a suitable underframe or substructure 2.

Disposed concentrically within the stator 1 and mounted on the extremity of a vertical spindle or shaft 3 suitably fixed in the underframe or substructure 2 is the rotor 4 and the external face or periphery 5 of said rotor lies adjacent to the internal periphery 6 of the stator 1 and the lower portion 7 of the rotor 4 is curved outwardly in such a manner as to form a trough between the said rotor 4 and stator 1. The rotor 4 is formed integral with a narrow sleeve or collar 8 and said sleeve or collar, which embraces or takes a bearing upon the fixed spindle 3 is provided at its lowest extremity with a bevel wheel which meshes with a smaller wheel 10 keyed to a horizontally disposed spindle or shaft 11, and which latter spindle or shaft 11 is journaled in suitable bearings provided in the underframe or substructure 2. This shaft or spindle 11 is provided at its outermost extremity with suitable pulleys or the like 12 in order to enable the machine to be driven by any suitable motive power.

From the foregoing arrangement of spindles and gear wheels it will be understood that the rotor 4 can be revolved within the stator 1 by rotating or driving the aforementioned pulleys or the like 12.

Disposed vertically within the stator 6 and projecting slightly from the internal face or periphery thereof are a series of rotatable circular disks 13 each having a central spindle 14 which is journaled transversely within the stator 1, and said disks 13 are approximately the same diameter as the width of the face of the stator 1.

The external or projecting faces of the disks 13 are of somewhat conical or convex formation while secured to the internal face of each of the said disks 13 is a gear wheel 15 and each gear wheel 15 is adapted to mesh with a horizontal gear or spur wheel 16 which takes a bearing or is journaled around the aforedescribed sleeve 8 integral with or secured to the rotor 4.

Keyed or secured to a sleeve 19 loosely mounted upon the shaft 11 is a further gear wheel 17 and this latter wheel is adapted to mesh with a series of teeth provided on the underside of the horizontal spur wheel 16.

The sleeve 19 is driven in the same direction as that of the shaft 11 but preferably at a different speed and in operation it will be seen that upon rotating the said shaft 11 by means of the pulleys 12 the rotor 4 is revolved as aforedescribed and upon rotating at the same time the sleeve 19 by means of the pulleys 20 in the same direction as that of the shaft 11 the disks 13 are revolved through the medium of the horizontal and vertical gear wheels 16 and 17. By this arrangement of gear wheels it will be seen that upon rotating the shaft 11 and sleeve 19 in the same direction as aforementioned the bottoms or lower halves of the disks always travel in the same direction as that of the rotor 4.

Ball thrust bearings 18 may be disposed at positions along the sleeve 8 and may be arranged between the extremities of the boss provided on the horizontal gear wheel 16 and the bosses provided upon the rotor 4 and gear wheel 9. Also a third ball thrust race may be disposed between the bevel wheel 9 and a suitable portion of the underframe or substructure 2. The gear wheels 16, 17, 9 and 10 are so dimensioned as to enable the disks 13 to revolve at a much greater speed than that of the rotor 4 as well as in the opposite direction to that of the said rotor.

The operation is as follows:—The dough is fed into the trough between the rotor 4 and stator 1 and rolled by the action of the rotor against the resisting action of the stator until it is caught up or engaged by the projecting face of a disk, the revolution of which stretches, draws down and tightens the dough toward the closing at the same time partly turning it around, after which it is operated upon by the rotor 4 and successive disks 13 in the same manner until at the end of the trough it is delivered with the skin completely stretched, drawn down, and tightened to the closing.

In a modification of the present invention instead of arranging the revolving disks 13 in the stator 1 they may be mounted in the rotor 4 in which case the stator 1 would be provided with the curved formation 7 of the trough. In this instance the rotor 4 is driven through the medium of a vertical and horizontal shaft having bevel wheels in mesh and the gear wheels 15 preferably secured to the extremities of the disk spindles 14 are adapted to mesh with a toothed circular rack which is stationary or fixed. Thus it will be seen that upon the rotor 4 being revolved the disks provided thereon are also rotated on account of their gear wheels engaging the circular fixed rack.

According to another form of the present invention as illustrated in Figs. 2 and 3 the trough 1 is of straight or substantially straight configuration and the dough is fed in at the one extremity and leaves or is removed at the other extremity while means are provided for moving or passing the dough along the said trough. The disks 13 are disposed adjacent to one another their faces projecting from a vertical longitudinal disk frame 21, the central spindles of such disks taking a bearing in this frame. Carried by a suitable substructure or underframe 22 are two cylindrical rollers or drums 23 and these rollers or drums carry an endless band 24 which is disposed longitudinally before the row of disk faces 13 and the construction of the substructure 22 is preferably such that the drums 23 together with the endless band 24 incline away from the disks 13 so leaving a channel 1 of somewhat V-formation. Suitable gearing mechanism is provided for driving the disks 13 as also the drums 23 and such disks 13 are preferably driven at a higher speed than that of the drums 23. Thus in operation upon the dough being fed into one extremity of the trough 1 same is carried along by the endless band 24 while the disks 13 revolve and tuck or press same downwardly, and so tighten the dough.

It will be obvious that if desired the trough 1 need not be straight in configuration but may be of arc formation or of other suitable shape.

To more particularize, the spindle 25 of the extreme disk may be continued onwardly and be provided with a pulley or pulleys 26 on its extremity and at a position somewhere along its length a further pulley 27 is incorporated. From this further pulley 27 a series of pulleys 28 may be driven and this series are disposed toward the bottom of the substructure or underframe 22 and from these series of pulleys 28 the disks 13 may be driven by means of endless belts as illustrated in Fig. 3.

In order to drive the drums 23 of the endless band 24 a diagonally disposed shaft 29 may be incorporated and such shaft may be provided with two gear wheels 30 and 31 which mesh in one instance with a gear wheel 32 on the driving disk spindle 25 and in the other instance with a gear wheel 33 on an extended portion of the shaft of one of the drums or cylinders 23 and the gear wheels 32, 30, 31 and 33 are preferably of such dimensions that the disks 13 revolve faster than the drums 23 as afore stated. In operation it will be noticed that upon the pulley 26 being driven, the entire series of disks 13 are driven as also is the endless band 24 through the aforementioned shaft mechanism.

The drums or cylinders 23 may be of any external configuration, cylindrical, conical, or curved according to the shape or section of the trough desired.

What I claim as my invention and desire to secure by Letters Patent is:—

1. A dough molding machine, comprising in combination, a frame, a stator mounted on said frame, a rotor mounted on said frame, within said stator, one or more disks mounted in said stator, and means adapted to rotate said disks and rotor.

2. A dough molding machine, comprising in combination, a frame, a stator mounted on said frame, a rotor mounted on said frame and within said stator, one or more disks rotatably mounted in the face of said stator, and means coacting with said disks and rotor adapted to simultaneously rotate said disks and rotor.

3. A dough molding machine comprising in combination, a frame, a stator mounted on said frame, a rotor mounted within said frame adapted to form a trough with said stator, a plurality of disks rotatably mounted in the face of said stator, and means coacting with said disks and rotor for simultaneously rotating said disks and rotor.

4. A dough molding machine comprising in combination, a frame, a stator mounted on said frame, a rotor mounted within said stator, a plurality of convex elements rotatably mounted on said stator and adapted to operate upon the dough, and means for simultaneously rotating said elements and rotor, substantially as described.

5. A dough molding machine comprising in combination, a frame, a stator mounted upon said frame, a rotor mounted within said stator forming an annular channel therewith, a series of convex elements rotatably mounted in said annular channel, and means for rotating said convex elements and rotor, substantially as described.

6. A dough molding machine comprising in combination, a frame having a circular cross sectional area, a stator mounted adjacent the periphery of said frame, a rotor mounted within said stator and forming an annular channel therewith, a series of convex elements rotatably mounted within said annular channel, and means for simultaneously rotating said elements and rotor, substantially as described.

7. A dough molding machine comprising in combination, a frame, a stator mounted on said frame, a rotor mounted within said stator adapted to form a substantially V-shaped trough with said stator, one or more disks rotatably mounted in said stator, and means for simultaneously rotating said disks and rotor in the same direction and at the same speed.

In witness whereof I have hereunto set my hand in the presence of two witnesses.

WILLIAM HEYCOCK RIPPIN.

Witnesses:
HARRY CATCHESIDE,
FRED. W. MOORE.

Copies of this patent may be obtained for five cents each, by addressing the "Commissioner of Patents, Washington, D. C."